United States Patent [19]

Inokuchi et al.

[11] Patent Number: 5,745,459
[45] Date of Patent: Apr. 28, 1998

[54] METHODS AND APPARATUS FOR MANAGING RECORDING MEDIUM

[75] Inventors: Tatsuya Inokuchi, Kanagawa; Shigeki Tsukatani, Tokyo; Tadayuki Misaizu, Kanagawa, all of Japan

[73] Assignee: Sony Corporation, Tokyo, Japan

[21] Appl. No.: 824,071

[22] Filed: Mar. 24, 1997

Related U.S. Application Data

[63] Continuation of Ser. No. 338,241, Nov. 14, 1994, abandoned.

[30] Foreign Application Priority Data

Nov. 12, 1993 [JP] Japan ................. 5-283722

[51] Int. Cl.$^6$ ........................................ G11B 5/09
[52] U.S. Cl. ............................. 369/54; 369/58
[58] Field of Search ............................. 369/47, 48, 50, 369/54, 58, 32, 30, 33, 53, 124

[56] References Cited

U.S. PATENT DOCUMENTS

| | | |
|---|---|---|
| 5,150,339 | 9/1992 | Ueda et al. ................. 369/32 |
| 5,303,219 | 4/1994 | Kulakowski et al. ........ 369/58 X |
| 5,309,420 | 5/1994 | Jaquette et al. ............. 369/58 |
| 5,544,137 | 8/1996 | Ohara et al. ................. 369/54 |
| 5,559,777 | 9/1996 | Maeda et al. ................ 369/50 |

*Primary Examiner*—Paul W. Huber
*Attorney, Agent, or Firm*—William S. Frommer; Alvin Sinderbrand

[57] ABSTRACT

A control apparatus for use with a recordable recording medium, such as a write once compact disc (CD-WO), in accordance with a SCSI-2 interface previously defined for a pre-recorded recording medium, such as a normal CD, automatically sets and updates attribute information needed for recording the CD-WO. When the CD-WO is blank or partially written, track information pages, in addition to a disc information page, are used to manage recording medium attribute information. The disc and track information pages are associated with corresponding disc and track changeability information pages.

6 Claims, 9 Drawing Sheets

METHODS AND APPARATUS FOR MANAGING RECORDING MEDIUM

This application is a continuation of application Ser. No. 08/338,241, filed on Nov. 14, 1994, now abandoned.

BACKGROUND OF THE INVENTION

The present invention relates to methods and apparatus for use in controlling the recording of an information signal on a recordable information recording medium, such as a write-once optical disc.

A small computer system interface (SCSI) interface standard is set forth in American National Standards Institute (ANSI) X3T9/89-042 SMALL COMPUTER SYSTEM INTERFACE (SCSI-2).

In equipment that conforms to the SCSI interface, such as a compact disc (CD) drive, information accompanying commands, such as a read command, may change at each command, and so such accompanying information, referred to herein as parameters, is considered to be dynamically changeable.

Table 1 shows a read command, as defined by the SCSI interface. This read command is used to request data transfer from a target (e.g., the CD drive) to an initiator (e.g., a host computer connected to the CD drive).

TABLE 1

READ COMMAND

| Byte | Bit 7 | 6 | 5 | 4 | 3 | 2 | 1 | 0 |
|---|---|---|---|---|---|---|---|---|
| 0 | Operation code (28h) | | | | | | | |
| 1 | Logical unit number | | | DPO | FUA | Empty | | Rel. addr (a) |
| 2 to 5 | (MSB) | | | Logical block address | | | | (LSB) |
| 6 | Empty | | | | | | | |
| 7 to 8 | (MSB) | | | Transfer length | | | | (LSB) |
| 9 | Control code | | | | | | | |

(a) relative address field:
1 relative addressing
0 absolute addressing

The read command shown in Table 1 comprises ten bytes.

Byte 0 of the read command represents a fixed operation code, namely, 28h ("h" indicates hexadecimal notation).

Bytes 1–9 of the read command are parameters.

Byte 1 of the read command represents a logical unit number in the most significant three bits (bits 7, 6, 5), that is, a target apparatus for data transfer. Up to eight such targets can be connected to the host computer.

Bit 4 of byte 1 of the read command is a disable page out (DPO) bit which determines whether an algorithm used by the buffer (cache) memory is enabled.

Bit 3 of byte 1 of the read command is force unit access (FUA) bit which determines whether data in the buffer memory is read out with priority. The data in the buffer memory was previously read from a recording medium such as a CD.

Bits 2 and 1 of byte 1 of the read command are empty bits.

Bit 0 of byte 1 of the read command is a relative addressing bit, indicating one of relative and absolute addressing.

Bytes 2–5 of the read command are a logical block address used as a read start address.

Byte 6 of the read command is empty.

Bytes 7–8 of the read command represent a transfer length, in other words, a read-out length from the above read start address.

Byte 9 of the read command is used as a control code and assigned to the last command.

Attribute information common to the CD is generally administered by using a mode page of the SCSI interface. An example of such attribute information is the number of times to carry out retry when an error occurs. The common attribute information is referred to as static parameters because these parameters cannot be generally changed after being defined.

Recently, there has been proposed a recordable optical disc, referred to herein as a write-once optical disc, CD-WO or CD-R, having the same size as the compact disc and having one surface coated with an organic recording material. Arbitrary data can be written (recorded) on the coated surface by radiation of a laser beam.

In a CD-WO drive for recording and reproducing the CD-WO, it is often the case that disc attribute information which affects a plurality of commands should be changed in a dynamic fashion in response to the present recorded state of the CD-WO and unchangeable previously recorded attribute information. The changed disc attribute information is used during the next recording of the CD-WO. However, since the conventional mode page does not provide for changeable information, it is not possible to manage disc attribute information for the CD-WO using the conventional mode page.

Furthermore, even though disc attribute information is defined as a parameter of a command, settings for certain attributes also depend on the present recorded state of the CD-WO. Thus, the conventional mode page is further inadequate.

OBJECTS AND SUMMARY OF THE INVENTION

Therefore, an object of the present invention is to provide an apparatus which avoids the aforementioned disadvantages of the prior art.

Another object of the present invention to provide an apparatus capable of efficiently managing medium attribute information, such as CD-WO attribute information.

In accordance with an aspect of this invention, the foregoing objects are met by provision of an apparatus for recording information on a recordable recording medium which reads unchangeable medium attribute information from the recordable recording medium, generates changeable medium attribute information in response to a recording state of the recordable recording medium, integrates the unchangeable and changeable medium attribute information to produce a mode page having integrated medium attribute information for use in a next recording of the recordable recording medium. The information recording apparatus is operable in accordance with a small computer system interface (SCSI).

It is not intended that the invention be summarized here in its entirety. Rather, further features, aspects and advantages of the invention are set forth in or are apparent from the following description and drawings.

DETAILED DESCRIPTION OF THE PREFERRED EMBODIMENTS

A control apparatus according to the present invention, such as a CD-WO disc drive in accordance with the SCSI interface described in ANSI X3T9/89-042 SMALL COMPUTER SYSTEM INTERFACE (SCSI-2), automatically sets and updates attribute information for managing a recording medium, thereby reducing the medium attribute management requirements placed on a host computer which communicates with the control apparatus. Specifically, the host computer may command the control apparatus to record information without specifying medium attribute information, since the control apparatus automatically generates such medium attribute information.

The control apparatus also provides recording medium attribute information in response to commands from the host computer. Further, the host computer may explicitly command the control apparatus to set attribute information.

Generally, when a disc drive according to the present invention is energized, default values are generated, such as by read out from nonvolatile storage.

When medium attribute information is recorded on the recording medium, the recorded attribute information is referred to as unchangeable medium attribute information.

When medium attribute information is subject to change, it is referred to as changeable medium attribute information. Generally, attributes which are changeable do not yet have their attribute values recorded on the recording medium; instead, values for the changeable attributes are generated by the disc drive, such as from predetermined default values. The unchangeable and changeable medium attribute information comprise integrated medium attribute information.

The present invention manages recording medium attribute information using a mode page, which comprises a disc information page and, when appropriate, also comprises a track information page. The present invention also uses disc changeability information and track changeability information. The contents of the disc and track information and changeability information pages are updated as needed each time the disc recording medium is replaced (another disc is loaded on the disc drive), each time information is recorded on the disc, and each time a track is reserved on the disc.

Figure 1:
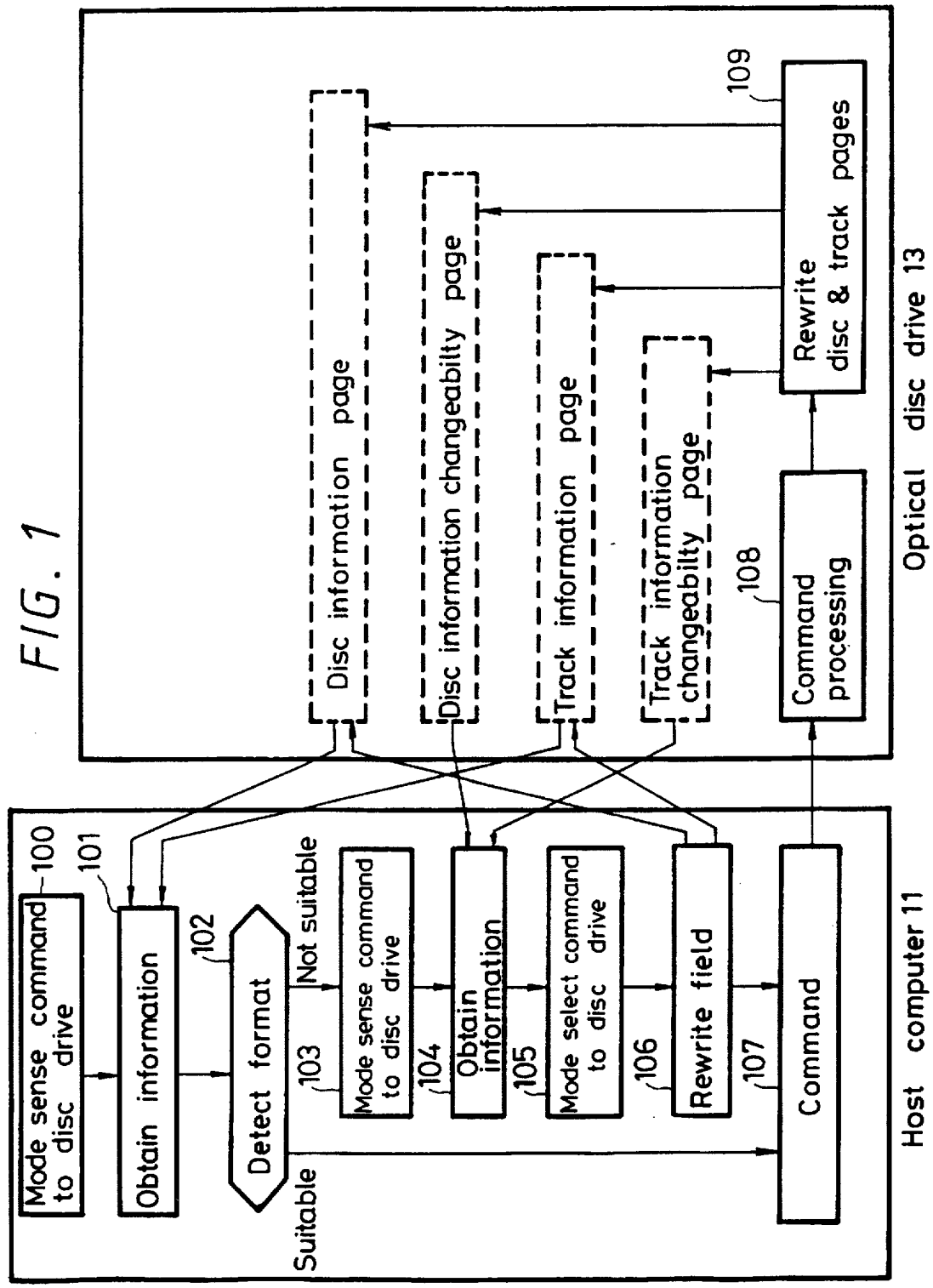
FIG. 1 is a flowchart used in explaining overall operation of the present invention.

FIG. 1 illustrates general operation of a host computer 11 and an optical disc drive 13 according to the present invention.

At step 100, the host computer sends a mode sense command requesting disc and track information to the disc drive. The disc drive includes a memory having disc and track information pages stored therein, and, in response to the mode sense command, sends the requested information to the host computer. At step 101, the host computer receives the requested information.

At step 102, the host computer determines whether the format of a track on the disc is suitable for an action which the host intends to take. If the format is suitable, then the host computer proceeds to step 107.

If the format of a track is not suitable for its intended action, then the host will try to change the format of the track. At step 103, the host computer sends a mode sense command requesting disc and track changeability information to the disc drive. The disc drive responds to the mode sense command by sending the requested information to the host computer. At step 104, the host computer receives the requested information. Assuming that the changeability information indicates that the track can be changed to a suitable format, then at step 105, the host computer prepares a mode select command for the disc drive, and at step 106, sends the mode select command to the disc drive. In response to the mode select command, the disc drive rewrites appropriate portions of the disc and track information and changeability information.

At step 107, the host computer issues a command, such as a write data command, to the disc drive. At step 108, the disc drive performs appropriate command processing, such as controlling the head to write data to the disc. At step 109, the disc drive automatically rewrites appropriate portions of the disc and track information and changeability information without intervention from the host computer. The host computer is expected to issue another mode sense command to obtain the rewritten information.

Figure 2:
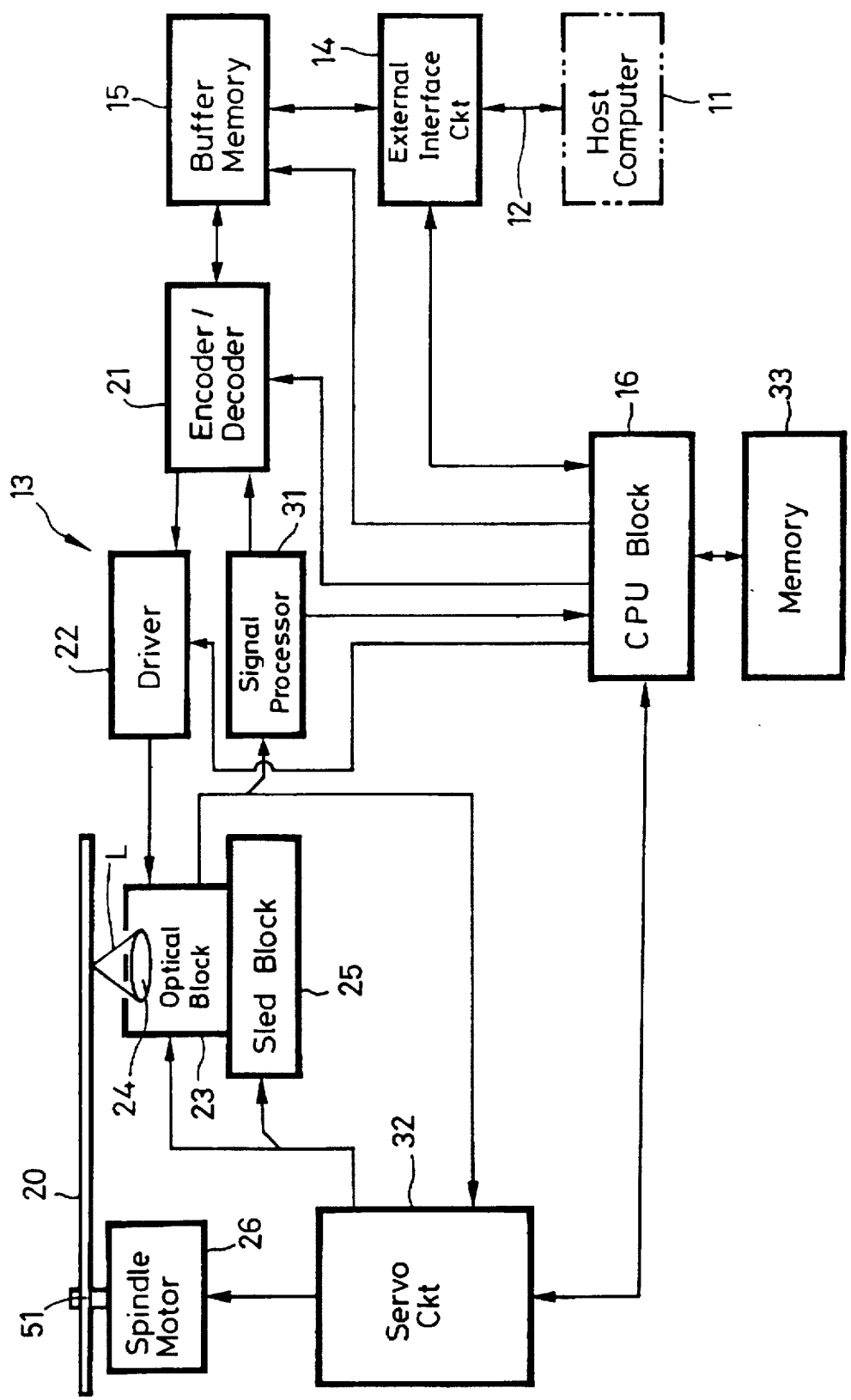
FIG. 2 is a block diagram showing an apparatus for recording information on a recording medium in the form of a recordable optical disk according to an embodiment of the present invention.

FIG. 2 illustrates an optical disc recording and reproducing system including a control apparatus for a recording medium according to the present invention.

An information recording medium, such as a writable (recordable) optical disc CD-WO 20, is used with a CD-WO drive 13 coupled to a SCSI bus 12 that is also coupled to a host computer 11. The CD-WO 20 can be ejected from and loaded onto the CD-WO drive 13. Up to eight drives or the like can be connected to the SCSI bus 12 using a daisy-chain configuration.

The SCSI bus 12 is coupled to an external interface circuit 14 of the CD-WO drive 13. The external interface circuit 14 is also coupled to a buffer memory 15 and a central processing unit (CPU) block 16. The buffer memory 15 serves to temporarily store data to be recorded on the CD-WO 20 and data read out from the CD-WO 20 or the like. The CPU block 16 includes a CPU, a read-only memory (ROM) for nonvolatile storage, a random access memory (RAM) for a work area, a register and other input and output interfaces. The CPU block 16 serves as control means.

An encoder/decoder 21 is adapted to modulate, using, for example, eight-to-fourteen modulation (EFM), data to be recorded on the CD-WO 20 and stored in the buffer memory 15 under control of the CPU block 16, and to supply the EFM-modulated data to a driver 22 which applies the EFM-modulated data to a laser beam generating means such as a laser diode of an optical block 23 in response to a control signal from the CPU block 16. A current supplied to the laser diode is increased upon recording and is decreased upon reproduction.

A laser beam emitted from the laser diode is introduced through an optical system (not shown) into an objective lens 24 and then radiated through the objective lens 24 to the surface of the CD-WO 20 as a laser beam L to thereby change a reflectivity of the organic pigment coating on the surface of the CD-WO 20.

A spindle motor 26 is operative to rotate the CD-WO 20. A sled block 25 having a sled motor, a linear guide or the like, functions to radially move the optical block 23 from the inner edge of the CD-WO 20 to the outer edge while data is being recorded on the CD-WO 20. Data is recorded on the disc surface either in a continuous (wholly) or write-once (partly) fashion.

Reflected light from the CD-WO 20 is introduced through the objective lens 24 into a quadrant photodiode (not shown) which provides an electrical signal that is processed and supplied as an RF signal to a signal processor 31 and a servo circuit 32.

The servo circuit 32 is supplied with velocity reference data, recording position/reproducing position designating data or the like from the CPU block 16. The servo circuit 32 is operative to control the rotation of the spindle motor 26 on the basis of these data and the RF signal. Also, the servo circuit 32 controls the optical block 24 to be moved at predetermined speed in the radial direction through the sled block 25 and controls the optical pickup of the optical block 23 in a tracking servo fashion and in a focusing servo fashion.

The laser diode of the optical block 32 supplies a light intensity monitor signal to the servo circuit 32 and the CPU block 16. The CPU block 16 compares the light intensity monitor signal and the reference light intensity signal and controls a light intensity of the laser beam L to be a predetermined light intensity by adjusting a gain of the driver 22 or the like on the basis of the compared result.

The signal processor 31 serves to process the RF signal and to apply the processed signal to the CPU block 16 and the decoding circuit portion of the encoder/decoder 21, so that reproduced data is decoded and stored in the buffer memory 15 under the control of the CPU block 16. The reproduced data stored in the buffer memory 15 is supplied through the external interface circuit 14 and the SCSI bus 21 to the host computer 11.

The CPU block 16 is coupled to a memory 33 which is operative to generate a mode page, that is, disc and track information and changeability information. The ROM of the CPU block 16 functions to store program data used by the CPU block 16 to decode SCSI interface commands and to carry out processing for the SCSI interface. The ROM also stores default values for the disc and track information and changeability information or the like, and supplies these default values to the CPU of the CPU block when the CD-WO drive 13 is energized or initialized.

When the host computer 11 is actuated and the CD-WO drive 13 is actuated, the host computer 11 may transfer to the RAM of the CPU block 16 additional program data used by the CPU block 16 to decode SCSI interface commands and to carry out processing for the SCSI interface.

Figure 3:
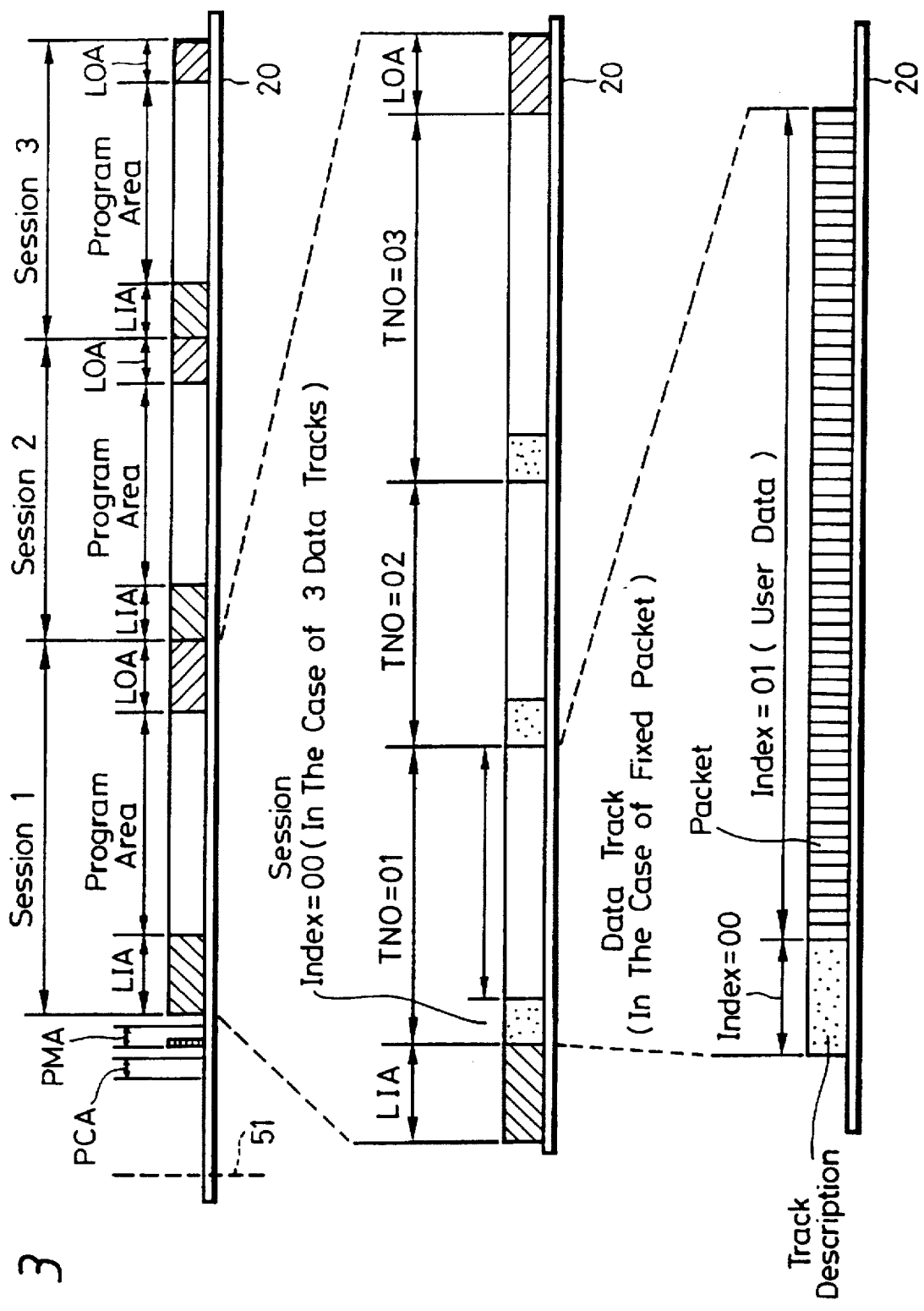
FIG. 3 is a diagram showing a logical structure of a CD-WO.

FIG. 3 shows an example of a logical structure of data recorded on the CD-WO 20.

As shown in FIG. 3, the CD-WO 20 includes a light amount calibrating area PCA, a program memory area PMA, a session 1, a session 2 and a session 3 radially disposed outward from a disc center 51. The light amount calibrating area PCA is a test write area used to determine the power of a laser beam.

Each of the sessions 1 to 3 is divided into a plurality of data tracks, for example, three data tracks having track numbers TNO=1 to 3. One data track corresponds to, for example, a piece of music recorded on the CD.

Each of the sessions 1 to 3 includes a lead in area LIA provided at the starting portion thereof to record a table of contents (TOC), that is, name and length data of each session or the like, and also includes a lead out area LOA marking the ending portion of the session.

The data track includes an index=00 area and an index =01 area. In the index=00 area, there are recorded a pre-gap which corresponds to a pause in the compact disc and a track recording type representing whether the recording type is a fixed length packet or a variable length packet. The track recording type field is defined by the disc drive and can be examined by the host computer using a mode sense command. User data can be recorded on the index=01 area in units of packets.

Figure 4:
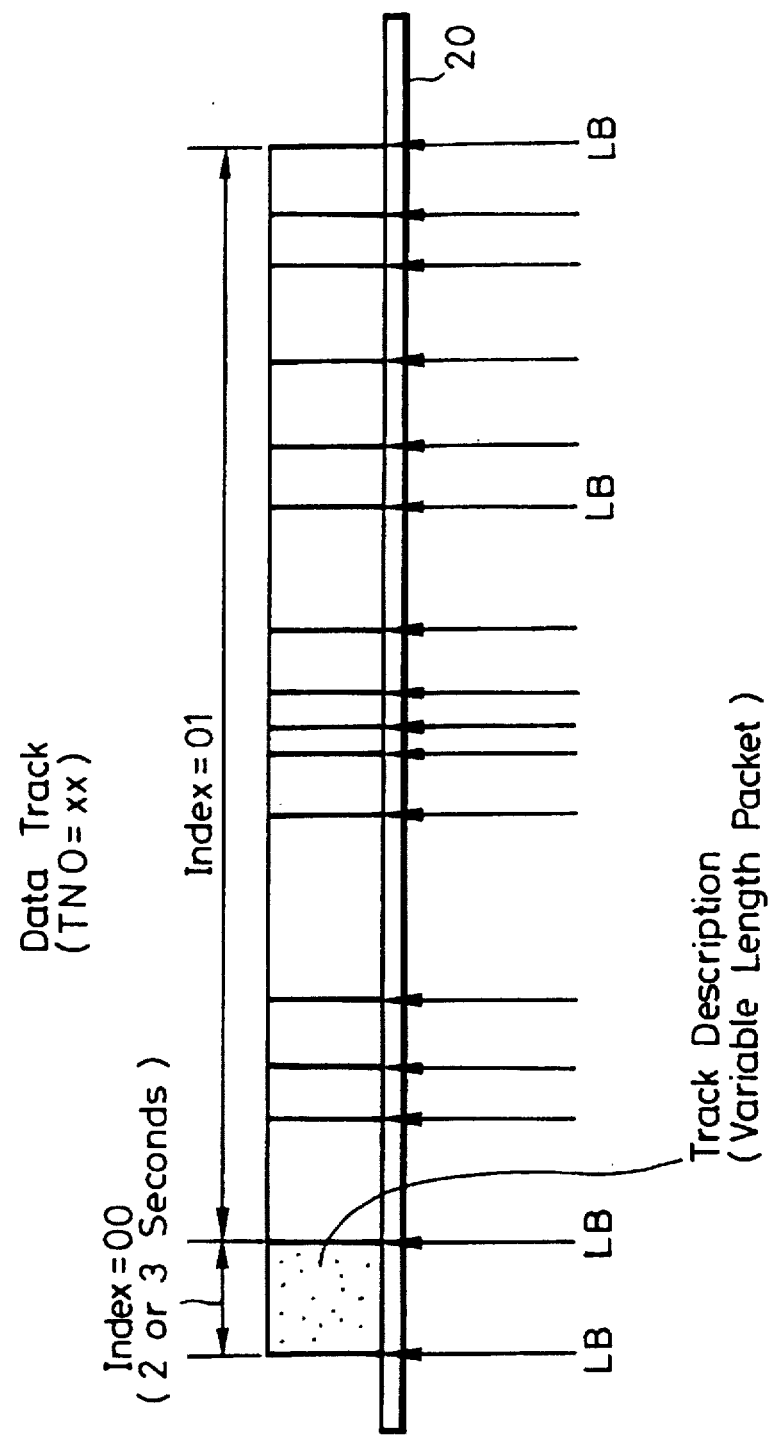
FIG. 4 is a diagram showing a variable length packet.

FIG. 4 shows an example of a data track, track number TNO=xx, having recorded thereon variable length packets. As shown in FIG. 4, link blocks LB are located at the start and end of the data track, between the index=00 area and the index=01 area, and between the packets.

A link block LB may be considered as spanning seven blocks. Two blocks are associated with the previous packet of user data and comprise a run-out block. One block is associated with the present packet and is the link block. The next four blocks are associated with the present packet and comprise a run-in block. The last block of the run-in block is followed by user data of the present packet.

Figure 5:
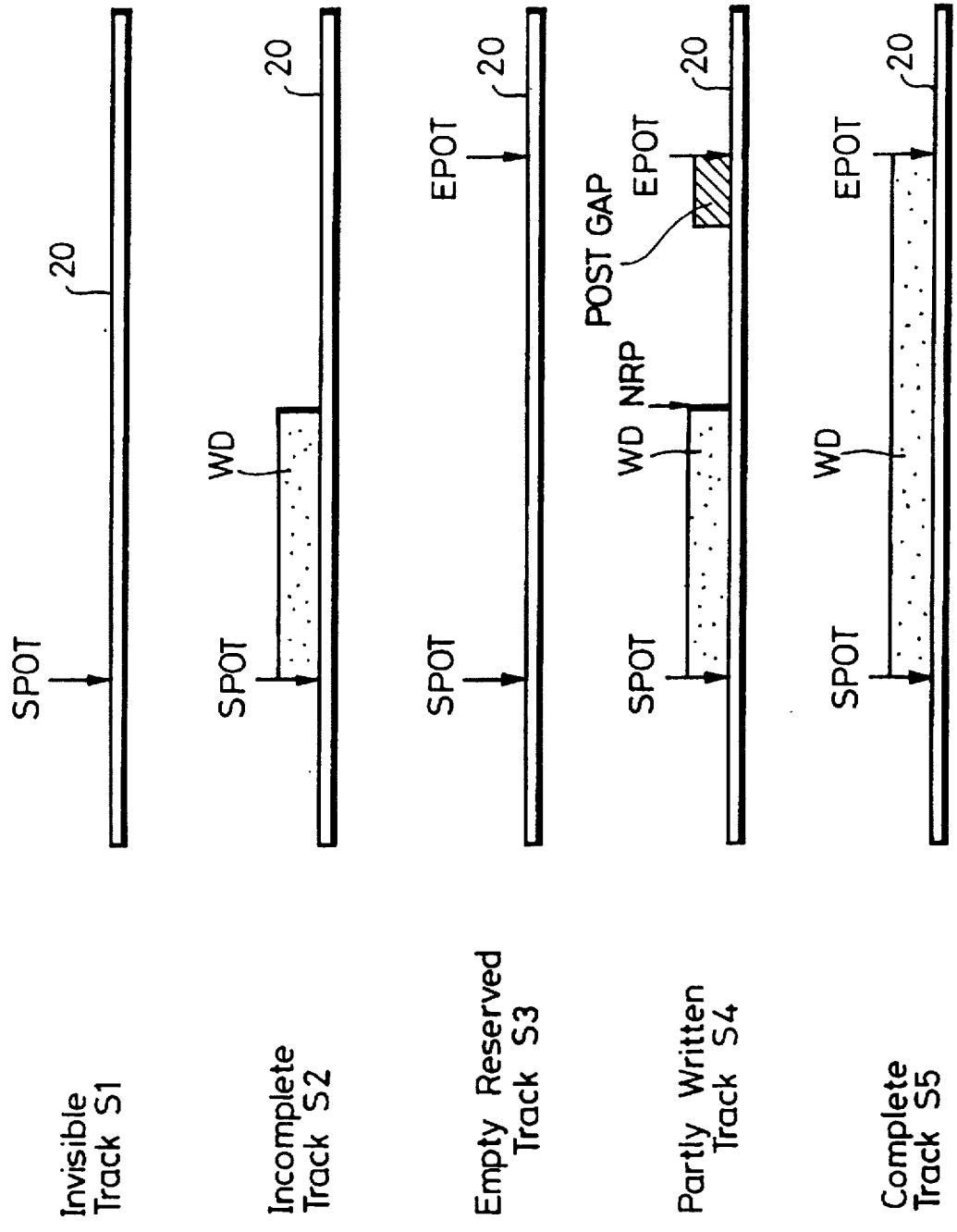
FIG. 5 is a diagram showing possible states of a track on a CD-WO.

FIG. 5 shows the possible states of the recorded data tracks on the CD-WO 20. The recording state of a data track is maintained in, for example, byte 7 of the track information page.

An invisible track state S1 represents the state in which only a track start point SPOT has been defined on the CD-WO 20.

An invisible track is a hypothetical track indicating a next track which can be written, and is used in the following cases. First, if the disc is a blank disc, the invisible track is the to-be-written first track, has its address specified in a first track number field such as byte 4 of the disc information page, and has a changeable value. Second, if a last track written on a disc is a complete track or reserved track and a last session is not finalized, the invisible track address is given by (last track address) +1. Third, if a last session is finalized with allowed next session, the invisible track is after the ending point of the lead in track of the next session.

There is at most one invisible track defined per disc. Once a disc has been fully written, an invisible track is no longer defined for the disc.

An incomplete track state S2 represents the state in which a track start point SPOT has been defined, a track stop time has not yet been defined, and recorded data WD exists on a part of the data track. An incomplete track is always a data track defined for packet recording.

An empty reserved track state S3 represents the state in which the data track start point SPOT and a data track end point EPOT have been defined. An empty reserved track is always a data track.

A partly written reserved track state S4 represents the state in which the data track start point SPOT and the data track end point EPOT have been defined and recorded data WD exists on a part of the data track. The partly written reserved track is always a data track defined for packet recording and may be referred to as "partly recorded track". Immediately after the recorded data WD is a next recording point (NRP). Just preceding the track end point EPOT is a post gap area.

A complete track state S5 represents the state in which the data track start point SPOT and the data track end point EPOT have been defined and recorded data WD exists on the entirety of the track between the start point SPOT and end point EPOT. The capacity of the blank area of a complete track is zero.

Figure 6:
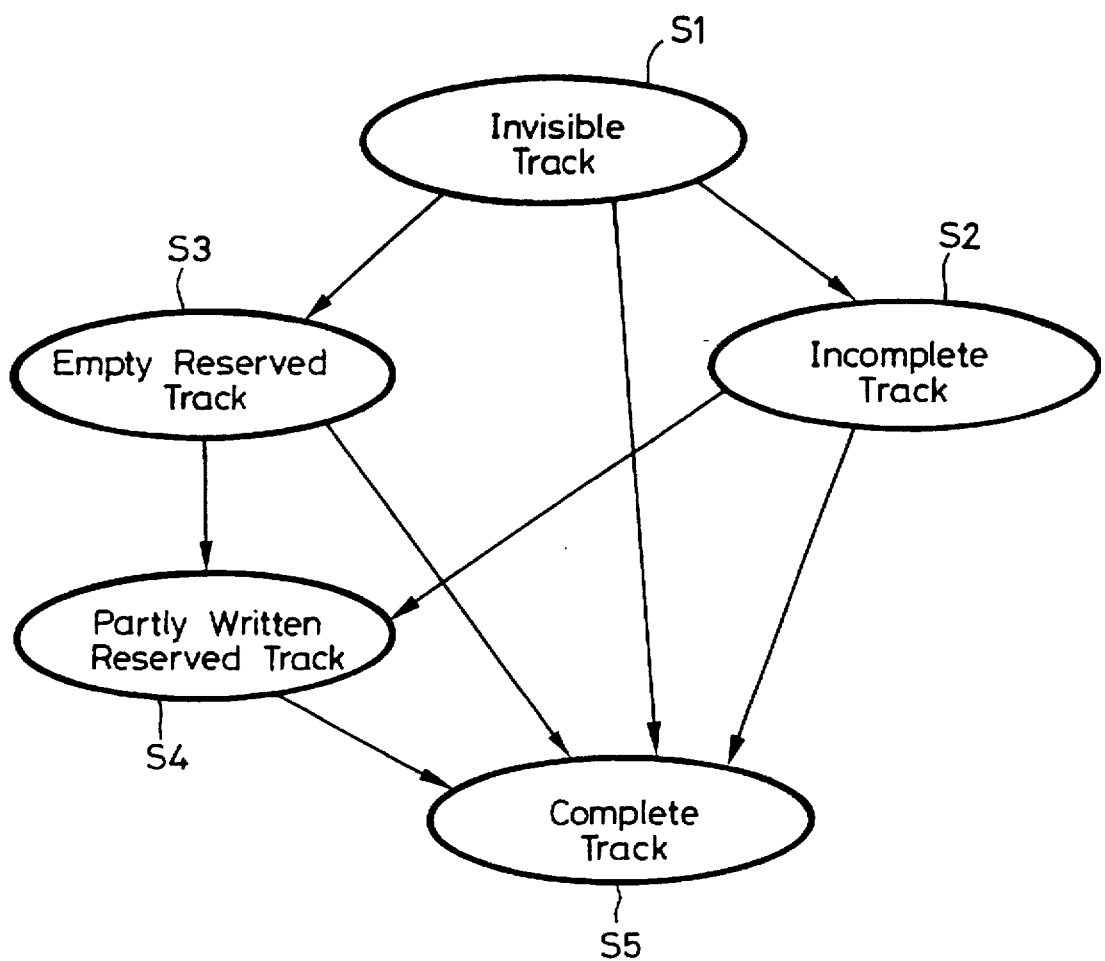
FIG. 6 is a transition state diagram for data tracks on the CD-WO.

FIG. 6 is a state transition diagram showing the transitions which are possible between the states of the recording medium shown in FIG. 5. In the present invention, these state changes are efficiently managed as medium attribute information, that is, an item of the mode page, by using changeability information for the mode page in the SCSI interface, that is, the state changes are reflected dynamically during recording.

From the invisible track state S1, the recording medium may be changed to one of the incomplete track state S2, the empty reserved track state S3 and the complete track state S5.

From the incomplete track state S2, the recording medium may be changed to one of the partly written reserved track state S4 and the complete track state S5.

From the empty reserved track state S3, the recording medium may be changed to one of the partly written reserved track state S4 and the complete track state S5.

From the partly written reserved track state S4, the recording medium may be changed to the complete track state S5.

Program data relating to the SCSI interface defined in the ANSI X3T9/89-042 SCSI-2 INTERFACE, will now be described.

In the optical disc system shown in FIG. 2, the host computer 11 and the CPU block 16 of the CD-WO drive 13 are such that, when one of them is an initiator, the other is a target. In general, the host computer 11 is the initiator and the CD-WO drive 13 is the target.

The host computer 11 can investigate and set complex medium attribute information for a CD-WO recording medium 20 loaded on the CD-WO drive 13 using a mode select command and a mode sense command based on the SCSI standards. Therefore, the host 11 can readily communicate with and use the optical disc system. It will be appreciated that the present invention is not limited to a CD-WO as the recording medium and may be applied to any recordable information recording medium. In this sense, there is the possibility that the present invention will be applied to an erasable CD.

The initiator sets medium attribute information in the target using a parameter list comprising bytes of parameters. The initiator transfers the parameter list to the target in the data out phase.

Tables 2 and 3 show two versions of a mode select command, as defined by the SCSI interface. This mode select command is used by an initiator, such as the host computer 11, to designate parameters to a target, such as the CD-WO drive 13. Parameters include, for example, information recording medium, a logical unit number or the like.

The mode select command of Table 2 has an operation code (15h), while the mode select command of Table 3 has an operation code (55h). Bytes 1–5 of Table 2 are parameters. Bytes 1–9 of Table 3 are parameters. Bit 4 of byte 1 is a page format (PF) designating bit. Bit 0 of byte 1 is a save page (SP) designating bit. Byte 4 of Table 2 is a parameter list length field, and bytes 7–8 of Table 3 are a parameter list length field. The fundamental difference between the mode select commands of Tables 2 and 3 is that the parameter list length shown in Table 2 is one byte shorter than the parameter list length shown in Table 3.

The control code field (byte 5 of Table 2, byte 9 of Table 3) is used to chain mode select commands. For example, if the host sends three consecutive mode select commands, the respective control code fields of these commands indicate: (another mode select command follows this command), (exactly one more mode select command follows this command), and (this is the final mode select command).

TABLE 2

MODE SELECT COMMAND (6)

| Byte | Bit 7 | 6 | 5 | 4 | 3 | 2 | 1 | 0 |
|---|---|---|---|---|---|---|---|---|
| 0 | Operation code (15h) | | | | | | | |
| 1 | Logical unit number | | | PF | Empty | | | SP |
| 2 | Empty | | | | | | | |
| 3 | Empty | | | | | | | |
| 4 | Parameter list length | | | | | | | |
| 5 | Control code | | | | | | | |

TABLE 3

MODE SELECT COMMAND (10)

| Byte | Bit 7 | 6 | 5 | 4 | 3 | 2 | 1 | 0 |
|---|---|---|---|---|---|---|---|---|
| 0 | Operation code (55h) | | | | | | | |
| 1 | Logical unit number | | | PF | Empty | | | SP |
| 2 to 6 | Empty | | | | | | | |
| 7 to 8 | (MSB) Parameter list length (LSB) | | | | | | | |
| 9 | Control code | | | | | | | |

Table 4 shows a mode sense command, as defined by the SCSI interface. This mode sense command is used by a target to report parameters to the initiator. Parameters include, for example, the information recording medium, the logical unit numbers or the like. The mode sense command is complementary to the mode select command.

The mode sense command of Table 4 has an operation code (1Ah). Bytes 1–5 of Table 4 are parameters. Bit 3 of byte 1 is a disable block descriptors (DBD) bit. The host sets the page control field to (00b) to obtain the disc and track information pages, and to (01b) to obtain the disc and track changeability information pages.

TABLE 4

MODE SENSE COMMAND

| Byte | Bit 7 | 6 | 5 | 4 | 3 | 2 | 1 | 0 |
|---|---|---|---|---|---|---|---|---|
| 0 | Operation code (1Ah) | | | | | | | |
| 1 | Logical unit number | | | Empty | DBD | Empty | | |
| 2 | Page control (a) | | Page code (b) | | | | | |
| 3 | Empty | | | | | | | |

TABLE 4-continued

MODE SENSE COMMAND

| Byte | Bit 7 | 6 | 5 | 4 | 3 | 2 | 1 | 0 |
|---|---|---|---|---|---|---|---|---|
| 4 | Allocation length | | | | | | | |
| 5 | Control code | | | | | | | |

(a) page control field:
00b present value
01b changeable value
10b default value obtained when the optical disk system is energized
11b value stored in nonvolatile memory ("b" indicates a binary value)
(b) page code descriptions: (mode page codes are used by all equipment)
00h vendor specification (no page format request)
01h–1Fh see particular apparatus
20h–3Eh vendor specification (page format request)
3Fh target returns all mode pages which it uses to the initiator Table 5 shows a mode parameter list indicating the format of a response, such as a disc or track information or changeability information page, sent from the disc drive to the host computer via the SCSI bus. The mode parameter list includes a mode parameter header indicating the length of the mode parameter list, a block description and a mode page. Table 6 shows a mode parameter block description, including a code representing the recording density of the information recording medium, the block number of the information recording medium and the block length. Bytes 1–8 of Table 6 are parameters. Table 7 shows a mode page format. Bytes 1-n of Table 7 are parameters. When the mode select command is in use, bit 7 of byte 0, which is the parameter savable (PS) bit, is an empty bit. Bits 0–5 of byte 0 comprise a page code field which represents a format defined for the mode page and the parameter.

TABLE 5

MODE PARAMETER LIST

| Byte | Bit 7 | 6 | 5 | 4 | 3 | 2 | 1 | 0 |
|---|---|---|---|---|---|---|---|---|
| 0-N | Mode parameter header | | | | | | | |
| 0-N | Block description | | | | | | | |
| 0-N | Mode Page | | | | | | | |

TABLE 6

MODE PARAMETER BLOCK DESCRIPTION

| Byte | Bit 7 | 6 | 5 | 4 | 3 | 2 | 1 | 0 |
|---|---|---|---|---|---|---|---|---|
| 0 | Recording density code | | | | | | | |
| 1 to 3 | (MSB) | | | Block number | | | | (LSB) |
| 4 | Empty | | | | | | | |
| 5 to 8 | (MSB) | | | Block length | | | | (LSB) |

TABLE 7

MODE PAGE FORMAT

| Byte | Bit 7 | 6 | 5 | 4 | 3 | 2 | 1 | 0 |
|---|---|---|---|---|---|---|---|---|
| 0 | PS (a) | Empty | Mode page code (b) | | | | | |
| 1 | Page length | | | | | | | |
| 2 to n | Mode parameter | | | | | | | |

(a) parameter savable field:
1 mode page can be stored in target while mode sense is in use
0 mode page not stored in target
(b) mode page code field:
0Ah control mode page
02h disc connect/re-connect page
09h peripheral device page
01h see apparatus specification
03h–08h see apparatus specification
0Bh–1Fh see apparatus specification
00h vendor specification (without page format request)
20h–3Eh vendor specification (with page format request)
3Fh return all page (effective only for mode sense command)

A mode page comprises a disc information page, shown in Table 8A, and a track information page, shown in Table 9A. The mode page is used for managing disc attribute information.

The mode page of the present invention for use with the SCSI interface includes changeable values that can be changed dynamically during recording. In conventional recording on the CD and the CD-ROM, the changeable function is used as a stationary one. In other words, changeable values are not changed and are instead used as fixed values.

The disc and track information pages are associated with corresponding disc and track changeability information pages which indicate whether the fields of the disc and track information pages are changeable.

Table 8A shows a disc information page for use with a recordable information medium such as the CD-WO 20. The disc information page shown in Table 8A is used by the CPU block 16 to obtain and set information of the CD-WO 20.

The CPU block 16 updates the contents of the disc information page when a CD-WO is loaded on the CD-WO drive 13, when information is recorded on the CD-WO 20 and when a track is reserved.

The disc information page is displayed in response to the mode sense command. Values can be set in the fields of the disc information page by the mode select command.

TABLE 8A

DISC INFORMATION PAGE

| Byte | Bit 7 | 6 | 5 | 4 | 3 | 2 | 1 | 0 |
|---|---|---|---|---|---|---|---|---|
| 0 | PS | Empty | Page code (22h) | | | | | |
| 1 | Page length | | | | | | | |
| 2 | Disc style (a) | | | | | | | |
| 3 | Disc type (b) | | | | | | | |
| 4 | First track number | | | | | | | |
| 5 | Final track number | | | | | | | |
| 6 | Number of sessions on disc | | | | | | | |
| 7 to 15 | Empty | | | | | | | |

TABLE 8A-continued

DISC INFORMATION PAGE

| Byte | Bit 7 | 6 | 5 | 4 | 3 | 2 | 1 | 0 |
|---|---|---|---|---|---|---|---|---|
| Expanded disc information of CD-WO | | | | | | | | |
| 16 | Disc status Recordability (c) | | Empty | | | Disc status compatibility (d) | | |
| 17 | Number of valid NRAs | | | | | | | |
| 18 | Track number of track information page | | | | | | | |
| 19 | Post gap (e) | | | | | | | |
| 20 to 23 | Disc ID code | | | | | | | |
| 24 to 27 | Disc application code | | | | | | | |
| 28 to 31 | Empty | | | | | | | |

(a) disc style field:
00h uninterrupted (continuous) recording (normal CD or fully recorded CD-WO)
80h interrupted recording (track or packet) (partially recorded CD-WO)
(b) disc type field:
00h CDDA disc or CD-ROM disc
10h CD-I disc
20h CD-ROM XA disc
others empty
(c) disc status recordability field:
00b blank disc
01b recordable disc and not blank disc
10b unrecordable disc
11b empty
(d) disc status compatibility field:
000b single session -- this disc has only a finalized single session
100b multi sessions -- this disc has all finalized sessions
101b multi sessions -- this disc has an unfinalized final session
010b single session -- this disc has only an unfinalized single session
others empty
(e) post gap field:
00h without post gap
01h with post gap Byte 2 of the disc information page is a disc style field.

The disc style field is considered unchangeable if the disc is the uninterrupted recording disc or the normal CD, indicated by (00h), or the disc is a CD-WO disc which has been partially written, indicated by (80h). Uninterrupted recording (writing) refers to the normal CD or CD-WO in which information has been recorded on the whole disc. Interrupted recording refers to a partial recording of the CD-WO at the track unit or at the packet unit.

The disc style field is considered changeable if the CD-WO is a blank disc, that is, no information has been written (recorded) in the PCA, PMA and program areas shown in FIG. 3, or the state of the disc is equivalent to a blank disc, namely, nothing is recorded in the PMA and program areas.

Whether the disc is a write-once disc can be determined by checking whether the disc is a multi-session CD-WO or whether a link block exists on the starting portion of the program area.

It is possible to carry out interrupted recording when information is recorded on only part of a CD-WO disc by setting the disc style field to (80h) using the mode select command. In this case, the whole of the track information page becomes valid, and, the following fields in the disc information page become valid: the disc type field (byte 3), a valid next recordable address (NRA) number field (byte 17), a track number of the track information page field (byte 18), a disc identification (ID) code field (bytes 20–23), and a disc application code field (bytes 24–27).

It is possible to carry out uninterrupted recording when information is recorded on only part of a CD-WO disc by setting the disc style field to (00h) using the mode select command. In this case, the whole of the track information page becomes invalid, and the following fields in the disc information page become invalid: the disc type field (byte 3), a valid next recordable address (NRA) number field (byte 17), a track number of the track information page field (byte 18), a disc identification (ID) code field (bytes 20–23), and a disc application code field (bytes 24–27).

Byte 3 of the disc information page is a disc type field. The value of the disc type field is written on the disc ID item of the PMA of the disc at the same time as that in the first program area. When this writing is finished, this field becomes unchangeable.

Byte 4 of the disc information page is a first track number field which indicates a minimum value that can be designated by the track number field of the track information page. The first track number field contains a value in the range 1–63h. When the first track number field is changeable, the disc is the blank disc or a disc that is placed in the same state as that of the blank disc, i.e., the state in which the first TOC item of the PMA and the program area are both devoid of recording. The first track number field becomes unchangeable when either of the TOC of the PMA or the first program area is written.

Byte 5 of the disc information page is a final track number field which indicates the maximum value that can be designated by the track number field of the track information page. The final track number field is always unchangeable.

When the first track number is changeable, the value equal to the first track number is returned as the final track number.

When the final track of the disc has not yet been recorded, the track number is returned.

If the final track of the disc is completed and a session which includes that track is not yet finalized (writing on all of the non-recording portions is not finished), information can be written from the next track and if the next track is neither the empty track nor the complete track, the final track number field returns the final track number+1 as the address of the invisible track (see FIG. 5).

When the disc is the normal CD or CD-ROM disc, i.e., not the CD-WO or a recordable disc, or when the disc is finalized and the session thereof is set to a final session, the final track number field is the actual final track number. In this case, there is no invisible track.

Byte 6 of the disc information page is a session number field representing the total number of sessions existing on the disc. This session number field is always changeable.

Bytes 16–31 are expanded disc information for use with the CD-WO.

Byte 16 of the disc information page is a disc status field. The disc status field is always unchangeable. Bits 7 and 6 of byte 16, the disc status field of the disc information page, represent the recordability of the disc. Bits 2, 1, 0 of byte 16 represent compatibility of the disc.

Byte 17 of the disc information page is a valid next recordable address (NRA) field showing how many NRAs exist on the whole disc. The value of the NRA field is agreed with the track number having the valid NRA. To check all NRAs, it is sufficient to check NRA fields of the corresponding track information page while the track number field of the track information page of the disc information page is being decremented from the final track number. Thus, it is possible to obtain track numbers to which all NRAs and address thereof belong. This valid NRA number is always unchangeable.

Byte 18 of the disc information page is a track number of track information page field. If the byte 18 field is varied by the mode select command, then the mode select command or the mode sense command can access the track information page having such track number. A value that can be designated on this field by the mode select command is greater than the first track number and smaller than the final track number. This field becomes unchangeable when the first track number and the final track number are equal to each other. This field becomes changeable when they are not equal to each other. At that time, it becomes possible to access track information for a number of tracks computed as (final track number—first track number+1).

Byte 19 of the disc information page is a post gap field used to determine whether a post gap is attached to the field when the track is closed. This field is valid and changeable only when the disc is the recordable disc. When the disc is the unrecordable disc, this field itself is invalid.

Bytes 20–23 of the disc information page are a disc ID code field. The disc ID code field always is changeable. When a disc ID has been written in the PMA of the disc, the value thereof is returned by reading this field using the mode sense command. Data is of 4 bytes and the starting portion thereof becomes 00h, which becomes a value which expressing remaining 3 bytes in a hexadecimal notation fashion. If a disc ID is not written in the disc, (FF FF FF FF h) is returned and a random number is automatically generated as a disc ID when the disc is recognized. Then, the automatically generated value is written in the disc ID item of the PMA of the disc. The disc ID item includes also the value of the disc type field and both of them are written at the same time, namely, when writing the first program area.

Bytes 24–27 of the disc information page are a disc application code field. The disc application code field always is unchangeable. When the disc application code is written in an ATIP (absolute time in program: absolute address written in the guide groove of the non-recording disc by stamper in a wobbling fashion) of the lead in area of the disc or the lead in point=(C0h) of the first session, such code is returned. Data is of 4 bytes and the starting portion becomes 00h, which value results from representing remaining 3 bytes in a hexadecimal notation. When the disc application code is not written in the disc, (FF FF FF FF h) is returned.

Table 8B shows a disc changeability information page having fields corresponding to the disc information page of Table 8A, which respectively represent the changeability of the fields of the disc information page.

TABLE 8B

DISC CHANGEABILITY INFORMATION PAGE

| Byte | Bit 7 | 6 | 5 | 4 | 3 | 2 | 1 | 0 |
|---|---|---|---|---|---|---|---|---|
| 0 | PS | Empty | Page code | | | | | |
| 1 | Changeability of Page length | | | | | | | |
| 2 | Changeability of Disc style | | | | | | | |
| 3 | Changeability of Disc type | | | | | | | |
| 4 | Changeability of First track number | | | | | | | |
| 5 | Changeability of Final track number | | | | | | | |
| 6 | Changeability of Number of sessions on disc | | | | | | | |
| 7 to 15 | Empty | | | | | | | |
| 16 | Changeability of Disc status Recordability | | Empty | | | Changeability of Disc status Compatibility | | |
| 17 | Changeability of Number of valid NRAs | | | | | | | |

TABLE 8B-continued

DISC CHANGEABILITY INFORMATION PAGE

| Byte | Bit 7 6 5 4 3 2 1 0 |
|---|---|
| 18 | Changeability of Track number of track information page |
| 19 | Changeability of Post gap |
| 20 to 23 | Changeability of Disc ID code |
| 24 to 27 | Changeability of Disc application code |
| 28 to 31 | Empty |

Table 9A shows a track information page for use with a recordable information medium such as the CD-WO 20 to obtain and set information concerning recording on a track designated by the track number of the track information page field, byte 18 of the disc information page.

The track information page is valid only when the disc style field of the disc information page has a value of (80h), i.e., the disc is a CD-WO in the partial write mode.

The contents of this track information page are updated each time the disc is replaced, information is written (recorded) on the disc or each time a track is reserved.

When the final track of a write-once disc is an empty reserved track (state S3 of FIG. 5), a partly written reserved track (state S4 of FIG. 5) or a complete track (state S5 of FIG. 5), a new invisible track (state S1 of FIG. 5) is produced after the final track, and a track information page for this new invisible track is generated in the memory 33 of associated with the CPU block 16 provided within the CD-WO drive 13.

TABLE 9A

TRACK INFORMATION PAGE

| Byte | Bit 7 | 6 | 5 | 4 | 3 | 2 | 1 | 0 |
|---|---|---|---|---|---|---|---|---|
| 0 | PS | Empty | Page code (23h) | | | | | |
| 1 | Page length | | | | | | | |
| 2 | Empty | | | | | | | |
| 3 | Track number | | | | | | | |
| 4 | Copyright (a) | | Data format (b) | | | | | |
| 5 | Write method (c) | | | | | | | |
| 6 | Session number | | | | | | | |
| 7 | Recording state of track (d) | | | | | | | |
| 8 to 11 | Start LBA of track | | | | | | | |
| 12 to 15 | Next recordable address | | | | | | | |
| 16 to 19 | Blank area capacity | | | | | | | |
| 20 to 23 | Fixed packet size | | | | | | | |
| 24 | Empty | | | | | | | |
| 25 | Start M field | | | | | | | |
| 26 | Start S field | | | | | | | |
| 27 | Start F field | | | | | | | |
| 28 | Empty | | | | | | | |
| 29 | End M field | | | | | | | |
| 30 | End S field | | | | | | | |
| 31 | End F field | | | | | | | |
| 32 | Empty | | | | | | | |
| 33 | Recordable point M field | | | | | | | |
| 34 | Recordable point S field | | | | | | | |
| 35 | Recordable point F field | | | | | | | |

TABLE 9A-continued

TRACK INFORMATION PAGE

| Byte | \multicolumn{8}{c}{Bit} |
|------|---|---|---|---|---|---|---|---|
|      | 7 | 6 | 5 | 4 | 3 | 2 | 1 | 0 |

(a) Copyright field:
00 copy
01 original of copyrighted material
10 copyright free (data can be copied)
11 empty
(b) Data format field:
00h without 2 ch audio preemphasis
01h without 4 ch audio preemphasis
02h with 2 ch audio preemphasis
03h with 4 ch audio preemphasis
04h–0Fh empty
10h CD-ROM mode 1
11h CD-ROM Yellow mode 2
12h CD-ROM mode 2 form ½
13h–1Fh empty
20h OPC (optimum power control) track
21h–FFh empty
(c) Write method field:
00h track uninterrupted recording
01h packet recording, fixed packet
02h packet recording, variable packet
03h–FFh empty
(d) Recording state field:
00h complete track
01h invisible track
02h empty reserved track
03h partly written reserved track
04h incomplete track
08h damaged track Byte 3 of the track information page is a hexadecimal track number field which matches the track designated by the track number of track information page field, byte 18 of the disc information page. This track number field is unchangeable.

Byte 4 of the track information page is a data form field which indicates the format of data that is recorded or will be recorded on this track. The data form field is changeable when the designated track is the invisible track or the empty reserved track.

Bits 7, 6 of the data form field are a copyright field. Bits 5, 4, 3, 2, 1, 0 of the data form field are a data format field. Using the copyright field, it is possible to determine the content of the copy bit of the sub code-Q used when information is written in this track. Using the data format field, it is possible to determine whether the control field of the sub code-Q used when information is written in this track and the mode byte (CD-ROM track mode) subheader in the CD-ROM header exist.

When the data form field is unchangeable, the copy bit/control, track mode and subheader of the content (subcode-Q) of the previously-written portion are displayed.

When the data form field is changeable and changed by the mode select command, the block length of the mode block description for recording and reproduction and the disc type field are related as follows:

| Data format<br>Byte 4 bits 5–0<br>Disc info base | Disc type<br>Byte 3<br>Disc info page | Block length<br>Bytes 5–8<br>Block descriptor |
|---|---|---|
| 10h | 00h | 2048/2336/2340/2352 |
| 11h | 00h | 2336/2340/2352 |
| 12h | 10h/20h | 2048/2056/2340/2352 |

When the disc type is 10h/20h, except for the first track, a data track having data format (12h) cannot be formed after an audio track having data format (00h to 03h).

When information is written in an empty reserved track, the track has to be a data track. Also, when information is written in an empty reserved track, if the immediately preceding track is a data track, then the track and the mode have to agree.

When an empty reserved track is the first track, if the disc type is (00h) then the first track must have the data format (10h/11h), and if the disc type is (10h/20h) then the first track must have the data format (12h).

Byte 5 of the track information page is a write method field which indicates a method of writing data that was recorded or is to be recorded. When the data format is the audio data format, the only value that can be set in this field is (00h) (track uninterrupted recording; track at once).

The write method field can be changed only when the present track, identified in byte 3, is the invisible track (state S1 of FIG. 5) or the empty reserved track (state S3 of FIG. 5). When data is written in the track, the changeable value is changed from, for example, the value "1" to the value "0". The mode page changeable value is not fixed and is constantly changed in a dynamic fashion in response to the recorded state of the disc.

Byte 6 of the track information page is a session number field which indicates the number of sessions included on this track. This field is always unchangeable.

Byte 7 of the track information page is a recording state field which indicates which of the recording states S1-S5 (see FIG. 5) describes the present track.

Bytes 8–11 of the track information page are a track start logical block address (LBA) field which indicates the start address of the user data area of the track by LBA. The LBA matches the start address which becomes the track index=01. This address is determined by the length of the pause interval having index=00. Whether this field is changeable depends on whether the length of the pause interval is variable. The length of the pause interval is determined by a combination of the data format of the immediately-preceding track and the data format of the track itself.

Table 10 shows relationships between combinations of the data formats of the preceding and present tracks and the length of the pause intervals. In Table 10, "changeable" is valid only when a present track is the invisible track or an empty reserved track.

TABLE 10

TRACK START LBA FIELD
(Bytes 8–11 of Track Information Page)

| Immediately-<br>preceding<br>track | Present track | Pause length<br>(seconds) | Changeability |
|---|---|---|---|
| Lead in | Audio | 2 ≤ p ≤ 3 | Changeable |
| Lead in | Mode 1 | p = 2 | Unchangeable |
| Lead in | Mode 2 | p = 2 | Unchangeable |
| Lead in | Mode 2, form | p = 2 | Unchangeable |

TABLE 10-continued

TRACK START LBA FIELD
(Bytes 8–11 of Track Information Page)

| Immediately-preceding track | Present track | Pause length (seconds) | Changeability |
|---|---|---|---|
| Audio | Audio | p ≧ 0 | Changeable |
| Audio | Mode 1 | p = 3 | Unchangeable |
| Audio | Mode 2 | p = 3 | Unchangeable |
| Audio | Mode 2, form ½ | Impossible | Impossible |
| Mode 1 | Audio | p ≧ 2 | Changeable |
| Mode 1 | Mode 1 | p = 2 | Unchangeable |
| Mode 1 | Mode 2 | p = 3 | Unchangeable |
| Mode 1 | Mode 2, form ½ | Impossible | Impossible |
| Mode 2 | Audio | p ≧ 2 | Changeable |
| Mode 2 | Mode 1 | p = 3 | Unchangeable |
| Mode 2 | Mode 2 | p = 2 | Unchangeable |
| Mode 2 | Mode 2, form ½ | Impossible | Impossible |
| Mode 2, form ½ | Audio | p ≧ 2 | Changeable |
| Mode 2, form ½ | Mode 1 | Impossible | Impossible |
| Mode 2, form ½ | Mode 2 | Impossible | Impossible |
| Mode 2, form ½ | Mode 2, form ½ | p = 2 | Unchangeable |

Bytes 12–15 of the track information page are a next recordable address (NRA) field which indicates the LBA that can be written by the user. This field is always unchangeable. If the track is the empty reserved track or invisible track, then this field takes the same value as that of the track start LBA field. When a fixed length packet is recorded, this field is an address conforming to, for example, a proprietary standard referred to as the orange book addressing method-2. In the case of the packet recording and write cache enable, NRA is obtained by adding the length of the non-recorded data stored in the buffer to the user data writable address. When the writable area does not exist in this track, which can be detected by determining that the blank area capacity field (bytes 16–19 of the track information page) has a value of zero, this NRA field becomes invalid.

Bytes 16–19 of the track information page are the blank area capacity field which indicates the total amount of the non-recorded portion of the track. This capacity does not include run-in, run-out and link blocks formed at the interrupted recording unit. Accordingly, all user data can be recorded in the capacity of this track indicated by this blank area capacity field. The blank area capacity field is always unchangeable.

Methods of calculating displayed capacity for uninterrupted recording and for variable length packet recording will now be described.

A method of calculating displayed capacity for uninterrupted reading is as follows:

(1) In the case of the empty reserved track:
Capacity=stop time–start LBA–post gap–2

The "2" in this equation represents a frame at the beginning and a frame at the end of a data packet. However, the post gap and the last run-out are not included.

(2) In the case of the invisible track:
Capacity=final possible time–start LBA–post gap–2 is calculated up to the final possible start time of the lead out. However, the post gap and the final run-out are not included.

A method of calculating displayed capacity for variable length packet recording is as follows:

(1) In the case of the empty reserved track:
  (a) When the write cache is disabled:
  Capacity=stop time–start LBA–post gap–2
  (b) When the write cache is enabled:
  Capacity=stop time–start LBA–post gap–2–length of data which is not yet written in the buffer In the case of (a) and (b), the post gap and the final run-out are not included.

(2) In the case of the partly written reserved track (partly recorded reserved track):
  (a) When the write cache is disabled:
  Capacity=stop time–NRP–post gap–2–4 The "4" in this equation represents frames needed for the CD-WO to be compatible with normal CDs.
  (b) When the write cache is enabled:
  Capacity=stop time–NRP–post gap–2–4–length of data which is not yet written in the buffer In the case of (a) and (b), the post gap and the final run-out are not included. Moreover, the run-in of the packet that is written in the next time also is not included.

(3) In the case of the incomplete track:
  (a) When the write cache is disabled:
  Capacity=final possible time–NRP–post gap–2–4
  (b) When the write cache is enabled:
  Capacity=final possible time–NRP–post gap–2–4 –length of data which is not yet written in the buffer In the case of (a) and (b), up to the final possible start time of the lead out is calculated. Moreover, the post gap and the final run-out are not included. Furthermore, the run-in of the packet that is to be written next is not included.

(4) In the case of the invisible track:
  (a) When the write cache is disabled:
  Capacity=final possible time–start LBA–post gap–2
  (b) When the write cache is enabled:
  Capacity=final possible time–start LBA–post gap 2 –length of data which is not yet written in the buffer In the case of (a) and (b), up to the final possible start time of the lead out is calculated. Moreover, the post gap and the final run-out are not included.

Bytes 25–27 of the track information page are a start minute (M) field, a start second (S) field and a start frame (F) field, respectively.

Bytes 29–31 of the track information page are an end minute field, end second field and end frame field, respectively.

Bytes 33–35 of the track information page are a recordable point minute field, recordable point second field and recordable point frame field, respectively.

Table 9B shows a track changeability information page having fields corresponding to the track information page of Table 9A, which respectively represent the changeability of the fields of the track information page.

TABLE 9B

TRACK CHANGEABILITY INFORMATION PAGE

| Byte | Bit | | | | | | | |
|---|---|---|---|---|---|---|---|---|
| | 7 | 6 | 5 | 4 | 3 | 2 | 1 | 0 |
| 0 | PS | Empty | Page code | | | | | |
| 1 | Changeability of Page length | | | | | | | |
| 2 | Empty | | | | | | | |
| 3 | Changeability of Track number | | | | | | | |
| 4 | Copyright Changeability | Changeability of Data format | | | | | | |
| 5 | Changeability of Write method | | | | | | | |
| 6 | Changeability of Session number | | | | | | | |
| 7 | Changeability of Recording state of track | | | | | | | |
| 8 to 11 | Changeability of Start LBA of track | | | | | | | |
| 12 to 15 | Changeability of Next recordable address | | | | | | | |
| 16 to 19 | Changeability of Blank area capacity | | | | | | | |
| 20 to 23 | Changeability of Fixed packet size | | | | | | | |
| 24 | Empty | | | | | | | |
| 25 | Changeability of Start M field | | | | | | | |
| 26 | Changeability of Start S field | | | | | | | |
| 27 | Changeability of Start F field | | | | | | | |
| 28 | Empty | | | | | | | |
| 29 | Changeability of End M field | | | | | | | |
| 30 | Changeability of End S field | | | | | | | |
| 31 | Changeability of End F field | | | | | | | |
| 32 | Empty | | | | | | | |
| 33 | Changeability of Next recordable point M field | | | | | | | |
| 34 | Changeability of Next recordable point S field | | | | | | | |
| 35 | Changeability of Next recordable point F field | | | | | | | |

Figure 7:
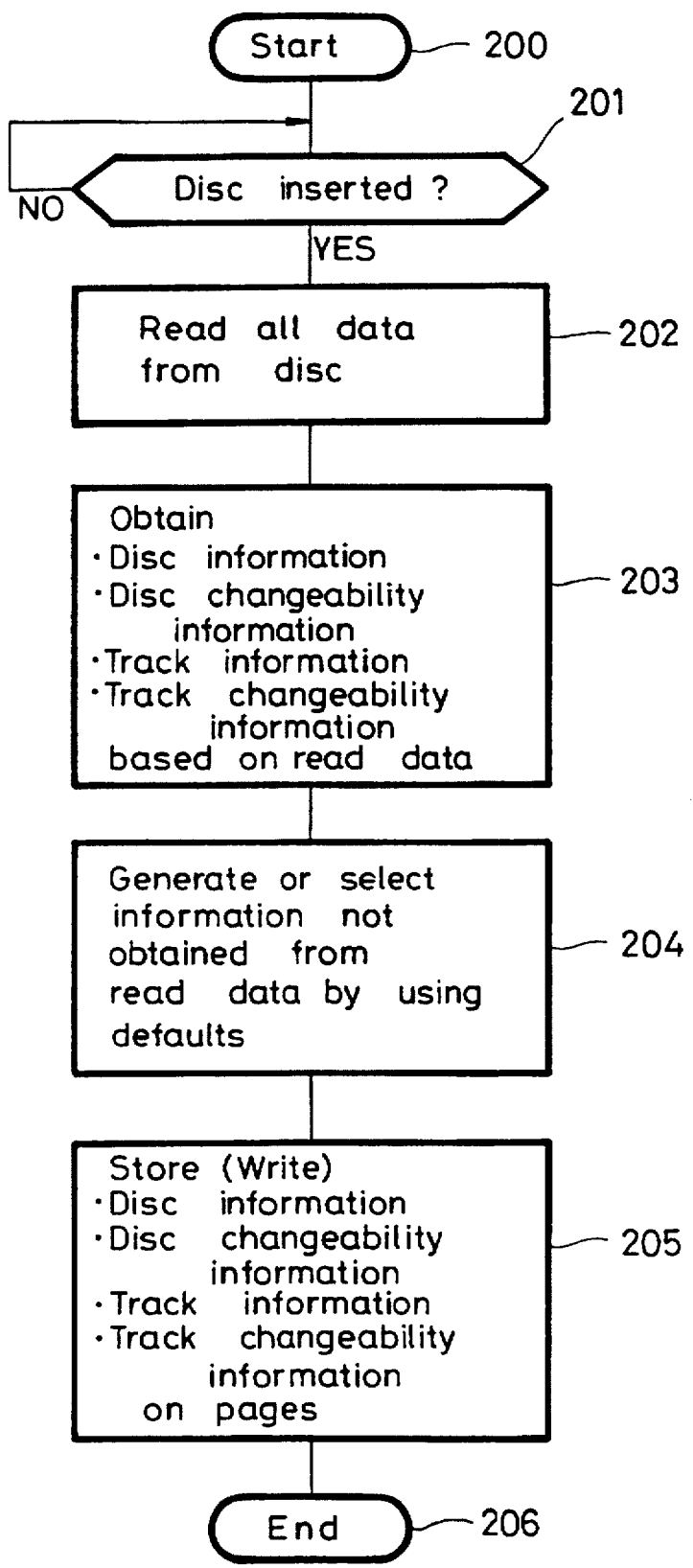
FIG. 7 is a flowchart showing initialization of a disc drive according to the present invention.

FIG. 7 is a flowchart showing initialization of a disc drive according to the present invention.

At step 201, the disc drive keeps checking whether a disc has been inserted. If a disc is detected, at step 202, the track and disc information and changeability information are read from the disc. At step 203, the disc and track information and changeability information is obtained from the data read from the disc. At step 204, information needed to complete the disc and track information and changeability information pages, i.e., information comprising part of these pages but which was not read from the disc, is generated by the disc drive by, for example, reading default values from the ROM included within CPU block 16 of FIG. 2. At step 205, the generated information is combined with the information read from the disc to produce disc and track information and changeability information pages which are stored in the memory 33.

Figure 8:
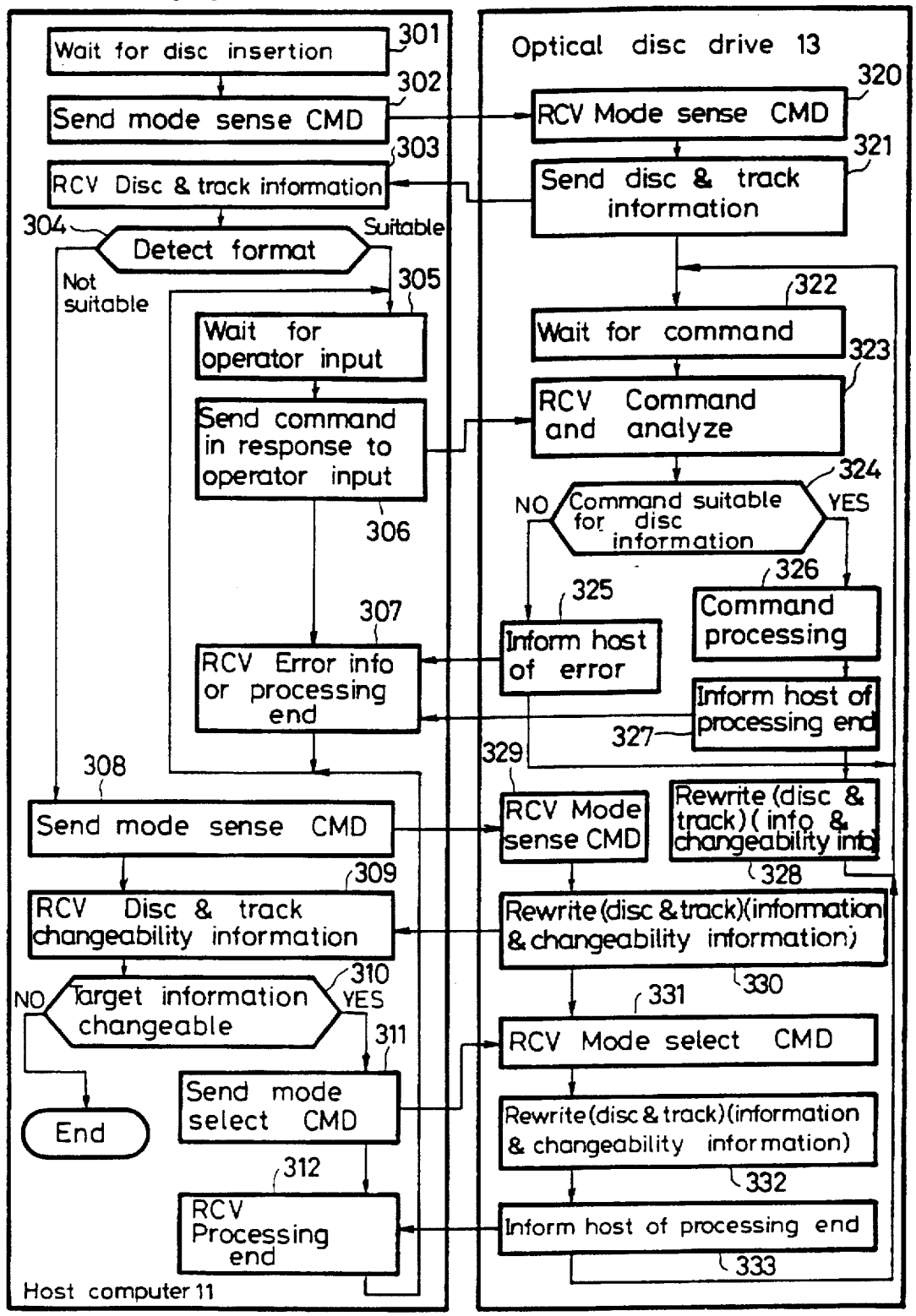
FIG. 8 is a flowchart showing interaction between a host computer and a disc drive according to the present invention.

FIG. 8 is a flowchart generally showing interaction between the host computer 11 and the disc drive 13.

At step 301, the host computer waits for a disc to be inserted. After a disc is detected, at step 302, the host sends a mode sense command to the disc drive requesting the disc and track information pages. At step 320, the disc drive receives the mode sense command, and at step 321, the disc drive sends the requested information pages to the host, and then at step 322, the disc drive waits for a command from the host.

At step 303, the host computer receives the requested information and, at step 304, the host computer determines whether the format of the track is suitable for its purpose. If so, at step 305, the host computer waits for operator input; the operator may be, for example, an application program. After the operator input is received, at step 306, the host computer sends a command to the disc drive in response to the operator input.

At step 323, the disc drive receives and analyzes the command from the host. At step 324, the disc drive determines whether it can execute the command. If not, at step 325, the disc drive sends an error message to the host and returns to step 322 to wait for another command. If the determination at step 324 was positive, then at step 326, the disc drive executes the command, and at step 327, notifies the host that the command has been processed. It is an important feature of the present invention that at step 328, the disc drive automatically updates the disc and track information and changeability information without intervention from the host, and then returns to step 322 to wait for another command.

At step 307, the host receives the error notification or command processing completed notification, and returns to step 305 to wait for additional operator input.

If the determination at step 304 was that the format of the track is unsuitable for the purpose of the host, then at step 308, the host computer sends a mode sense command to the disc drive requesting the disc and track changeability information pages. At step 329, the disc drive receives the mode sense command, and at step 330, the disc drive sends the requested changeability information pages to the host.

At step 309, the host receives the requested changeability information, and at step 310, the host computer determines whether the target information can be changed. For example, a track write method field (byte 5 of the track information page) is changeable until the track is written, at which time the field becomes unchangeable. If the target information is not changeable, then the format of the disc is simply not suitable.

If the target information is determined to be changeable at step 310, then at step 311, the host sends a mode select command to the disc drive to actually change the target information. At step 331, the disc drives receives the mode select command and at step 332, the disc drive changes the disc and track information and changeability information accordingly. At step 333 the disc drive notifies the host that the information has been changed, and returns to step 322 to wait for another command. At step 312, the host receives the notification that the target information has been changed, and returns to step 305 to wait for operator input.

Figure 9:
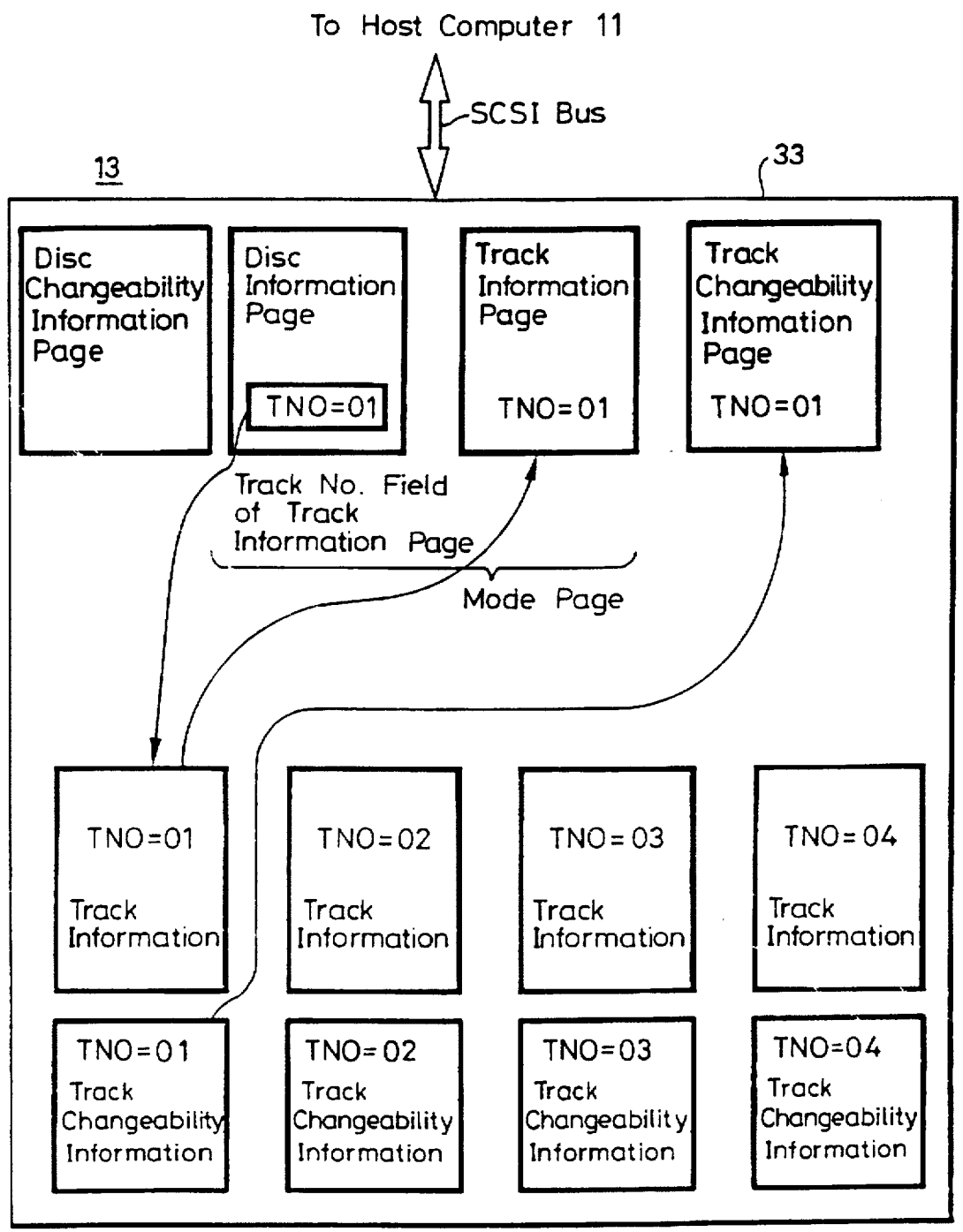
FIG. 9 is a diagram used to explain generation of a track information page in the mode page.

FIG. 9 is a conceptual diagram used to explain usage of the track information page of the mode page.

New track information is generated within the memory 33 of the CD-WO drive 13 when, for example, the final track of the write-once disk becomes the empty reserved track, the partly written reserved track or the complete track. Specifically, when track information for track number TNO=05 is generated after the track number TNO=04, the CPU block 16 sets data format (data form) (byte 4 of the track information page being generated), write method (byte 5 of the track information page being generated) and initial value of the fixed length packet size (bytes 20–23 of the track information page being generated) equal to the values in the corresponding fields of the track information page for the immediately preceding track (TNO=04) to provide the simplest combination on the format of the CD-WO 20.

When the optical disc system is energized, track information is generated from default values, that is, immediately preceding track information is not needed to generate a track information page.

With this arrangement, the host computer is released from considering the format of the CD-WO 20, which reduces the burden on the host computer 11. Specifically, when there are other CD-WO drives to be connected to the SCSI bus 12 in addition to the CD-WO drive 13, the optical disc system can be made high speed on the whole.

The CD-WO drive 13 records, in the memory 33, track information for all tracks existing on the CD-WO 20 serving as the information recording medium. However, as shown in FIG. 9, track information for only one track is displayed on the mode page of the SCSI interface at any time, to avoid the length and number of the mode page being dynamically changed when track information is generated. Track information for another track can be checked by simply changing the track number field of the track information page (byte 18 of the disc information page). When this field is changed, the CD-WO drive 13 copies the track information of the thus-designated track to the displayed track information page.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. An apparatus operable in accordance with small computer system interface (SCSI) commands transmitted through an SCSI interface from a host computer for recording information on a recordable recording medium loaded on the apparatus, comprising:

means for reading medium attribute information from said recordable recording medium, said medium attribute information indicating respective characteristics of said recording medium and some of which are unchangeable;

means for generating changeable medium attribute information indicating a respective recording state of said recordable recording medium and for automatically changing said changeable medium attribute information in response to performance of a recording on said recordable recording medium, reservation of a track on said recordable recording medium, and loading of a second recordable recording medium on the apparatus for recording in place of the first mentioned recordable recording medium;

means for integrating said unchangeable medium attribute information and said changeable medium attribute information to produce a mode page having integrated medium attribute information; and memory means apart from said recording medium and said host computer for storing said mode page having integrated medium attribute information for use in a next recording of said recordable recording medium without resort to said host computer.

2. The apparatus of claim 1, wherein said recordable recording medium is a write once optical disc.

3. The apparatus of claim 1, further comprising means for supplying said mode page from said memory means in response to a command from the host computer transmitted through said interface to the apparatus for recording.

4. The apparatus of claim 3, wherein each said mode page includes respective disk and track information pages, each said track information page corresponding to a track designated in the respective disk information page, said command specifies a particular track, and the supplied mode page includes a track information page for said particular track.

5. The apparatus of claim 1, further comprising:

means for supplying default medium attribute information from nonvolatile storage means; and means for integrating said default medium attribute information and said changeable medium attribute information to produce a mode page having integrated medium attribute information for use in a next recording of said recordable recording medium.

6. A method for operating an apparatus in accordance with small computer system interface (SCSI) commands transmitted through an SCSI interface from a host computer for recording information on a recordable recording medium, comprising:

providing on said recordable recording medium unchangeable medium attribute information which indicate respective characteristics of said recording medium;

reading said unchangeable medium attribute information from said recordable recording medium;

generating changeable medium attribute information indicating a recording state of said recordable recording medium and which is automatically changed in response to performance of a recording on said recordable recording medium, reservation of a track on said recordable recording medium, and replacement of said recordable medium;

integrating said unchangeable medium attribute information and said changeable medium attribute information to produce a mode page having integrated medium attribute information; and storing said mode page having integrated medium attribute information apart from said recording medium and said host computer for use in a next recording of said recordable recording medium without resort to said host computer.

* * * * *